(12) United States Patent
Cohen-Zur et al.

(10) Patent No.: US 10,949,754 B2
(45) Date of Patent: Mar. 16, 2021

(54) DECISION SUPPORT TOOL WITH INTERACTIVE SLIDERS

(71) Applicant: SAP Portals Israel Ltd., Ra'anana (IL)

(72) Inventors: Nirit Cohen-Zur, Ra'anana (IL); Rachel Ebner, Ra'anana (IL); Eyal Gal, Ashdod (IL)

(73) Assignee: SAP Portals Israel Ltd., Ra'anana (IL)

( * ) Notice: Subject to any disclaimer, the term of this patent is extended or adjusted under 35 U.S.C. 154(b) by 844 days.

(21) Appl. No.: 15/659,807

(22) Filed: Jul. 26, 2017

(65) Prior Publication Data

US 2019/0034805 A1    Jan. 31, 2019

(51) Int. Cl.
*G06N 5/02* (2006.01)
*G06F 3/0484* (2013.01)
*G06Q 10/06* (2012.01)

(52) U.S. Cl.
CPC .......... *G06N 5/02* (2013.01); *G06F 3/04847* (2013.01); *G06Q 10/067* (2013.01)

(58) Field of Classification Search
None
See application file for complete search history.

(56) References Cited

U.S. PATENT DOCUMENTS

| | | | |
|---|---|---|---|
| 7,873,942 B2 | 1/2011 | Shaburov et al. | |
| 8,291,214 B2 | 10/2012 | Helfman et al. | |
| 8,689,174 B2 | 4/2014 | Shaburov et al. | |
| 8,862,159 B2 | 10/2014 | Cohen-Zur | |
| 9,262,385 B2 | 2/2016 | Ebner | |
| 9,277,028 B2 | 3/2016 | Ebner et al. | |
| 2005/0210285 A1* | 9/2005 | Williams | G06F 16/9535 726/5 |
| 2008/0263591 A1* | 10/2008 | de Heer | H04N 21/4668 725/38 |
| 2010/0088148 A1* | 4/2010 | Presswala | G06Q 30/0207 705/7.29 |
| 2010/0309436 A1* | 12/2010 | Allen, Jr. | G06Q 10/10 353/21 |
| 2011/0162074 A1 | 6/2011 | Helfman et al. | |
| 2012/0072418 A1* | 3/2012 | Svendsen | G06F 3/048 707/724 |
| 2012/0226663 A1* | 9/2012 | Valdez Kline | G06F 16/40 707/640 |
| 2014/0040177 A1 | 2/2014 | Yahali et al. | |

(Continued)

*Primary Examiner* — Toan H Vu

(74) *Attorney, Agent, or Firm* — Fish & Richardson P.C.

(57) ABSTRACT

The disclosure generally describes methods, software, and systems, including a method for providing a recommended action. Data that is associated with requests and that is used in supporting actions made regarding the requests is collected from multiple sources. Default criteria based on the data and supporting a determination of a recommended action responsive to the given request is provided for presentation in the user interface. The user interface includes interactive sliders, each interactive slider being associated with a criterion and having a default slider position associated with a relative weighting factor for the criterion. An algorithm is executed that is associated with a request type of the given request. Absolute weights are assigned to the default criteria using the relative weighting factors. The given request is evaluated using the default criteria and the absolute weights to determine the recommended action, which is provided for presentation in the user interface.

18 Claims, 9 Drawing Sheets

(56) References Cited

U.S. PATENT DOCUMENTS

| | | |
|---|---|---|
| 2014/0123020 A1 | 5/2014 | Bleier et al. |
| 2014/0222914 A1 | 8/2014 | Ebner et al. |
| 2014/0282024 A1 | 9/2014 | Ebner et al. |
| 2015/0089389 A1 | 3/2015 | Cohen-Zur et al. |
| 2016/0071517 A1* | 3/2016 | Beaver .................... G06F 40/30 704/9 |
| 2017/0352048 A1* | 12/2017 | Richardson ........ G06Q 30/0203 |

* cited by examiner

600

```
┌─────────────────────────────────────────────────────────────────────────────┐
│ Collect, from multiple sources, data associated with requests and used in   │
│ supporting actions made regarding the requests                              │
│                                                                         602 │
└─────────────────────────────────────────────────────────────────────────────┘
                                      ↓
┌─────────────────────────────────────────────────────────────────────────────┐
│ Provide, for presentation in the user interface, default criteria based on  │
│ the collected data and supporting a determination of a recommended action   │
│ in response to the given request, the user interface including interactive  │
│ sliders, each interactive slider associated with a criterion and having a   │
│ default slider position associated with a relative weighting factor for the │
│ criterion                                                                   │
│                                                                         604 │
└─────────────────────────────────────────────────────────────────────────────┘
                                      ↓
┌─────────────────────────────────────────────────────────────────────────────┐
│ Execute an algorithm associated with a request type of the given request 606│
│  ┌───────────────────────────────────────────────────────────────────────┐  │
│  │ Assign, using the relative weighting factors, absolute weights to the │  │
│  │ default criteria                                                  608 │  │
│  └───────────────────────────────────────────────────────────────────────┘  │
│                                      ↓                                      │
│  ┌───────────────────────────────────────────────────────────────────────┐  │
│  │ Evaluate the given request using the default criteria and the        │  │
│  │ assigned absolute weights to determine the recommended action in      │  │
│  │ response to the given request                                         │  │
│  │                                                                   610 │  │
│  └───────────────────────────────────────────────────────────────────────┘  │
└─────────────────────────────────────────────────────────────────────────────┘
                                      ↓
┌─────────────────────────────────────────────────────────────────────────────┐
│ Provide, for presentation in the user interface, the recommended action     │
│                                                                         612 │
└─────────────────────────────────────────────────────────────────────────────┘
```

FIG. 6

DECISION SUPPORT TOOL WITH INTERACTIVE SLIDERS

BACKGROUND

The present disclosure relates to decision making. For example, decisions involving many criteria are often complex and difficult to weigh or calculate in a reasonable or consistent. Assuming that all relevant data is accessible using an application, it is not necessarily easy to make a decision. Some parameters may be in conflict with one another, often leading the user towards decisions of opposite directions.

SUMMARY

This disclosure generally describes computer-implemented methods, software, and systems for recommending actions. One computer-implemented method includes: collecting, from multiple sources, data associated with requests and used in supporting actions made regarding the requests; providing, for presentation in the user interface, default criteria based on the collected data and supporting a determination of a recommended action in response to the given request, the user interface including interactive sliders, each interactive slider associated with a criterion and having a default slider position associated with a relative weighting factor for the criterion; executing an algorithm associated with a request type of the given request including: assigning, using the relative weighting factors, absolute weights to the default criteria; and evaluating the given request using the default criteria and the assigned absolute weights to determine the recommended action in response to the given request; and providing, for presentation in the user interface, the recommended action.

In some implementations, a recommended action simulator can enable the user to select desired criteria weights using interactive sliders that correspond to criteria values and may be adjusted through a learning system. The recommended action simulator can also provide default criteria weights used for the recommended action (e.g., Approve or Reject).

The foregoing and other implementations can each optionally include one or more of the following features, alone or in combination. In particular, one implementation can include all the following features:

In a first aspect, combinable with any of the previous aspects, the method further includes: receiving adjustments, via the user interface, including one or more of: receiving an adjustment to an interactive slider for a criterion to a new slider position, and using the received adjustment to update the relative weighting factor for the criterion; and receiving an adjustment to an on/off switch designating whether the criterion is used in the algorithm, and using the received adjustment to update the relative weighting factor for the criterion; and recalculating, based on the updated relative weighting factors, the absolute weights for the criteria; re-executing the algorithm using the recalculated absolute weights, including recalculating the recommended action; and providing, for presentation in the user interface, the recalculated recommended action.

In a second aspect, combinable with any of the previous aspects, the recommended action is a first value and a recalculation of the recommended action is a second value different from the first value.

In a third aspect, combinable with any of the previous aspects, the method further includes: in response to receiving adjustments to the interactive sliders, executing a learning mechanism to determine an updated set of default criteria including default weights based on the received adjustments.

In a fourth aspect, combinable with any of the previous aspects, the recommended action is one of an approval or a rejection.

In a fifth aspect, combinable with any of the previous aspects, the default criteria are specific to a particular administrative group associated with the user.

In a sixth aspect, combinable with any of the previous aspects, the recommended action is specific to a request by a user.

In a seventh aspect, combinable with any of the previous aspects, the method further includes: receiving, from a template in a user interface, inputs changing a number of criteria associated with the algorithm, including receiving metadata about the number of criteria associated with the algorithm, and providing information for drawing a dynamic UI presenting information for the criteria, including sliding bars and controls.

In an eighth aspect, combinable with any of the previous aspects, the algorithm is specifically associated with particular data.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 6 is a flowchart of an example method for providing a recommended action.

DETAILED DESCRIPTION

Figure 1:
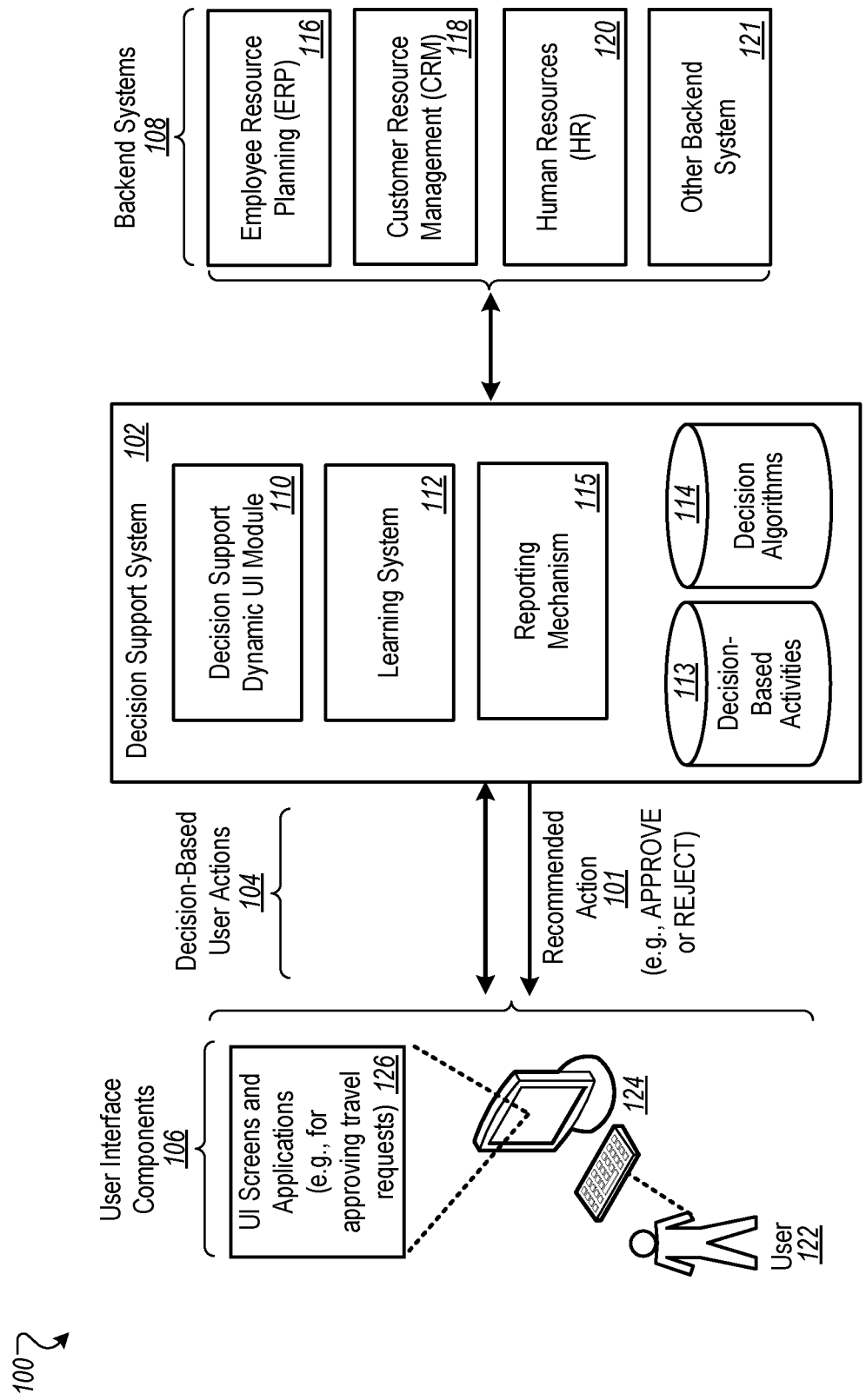
FIG. 1 is a block diagram of an example environment for providing a recommended action.

This disclosure generally describes computer-implemented methods, software, and systems for providing a recommended action. Data that is associated with requests and is used in supporting actions made regarding the requests is collected from multiple sources. For example, requests can include employee-related requests to which a manager needs to respond, such as requests for employee travel, requests for employee leave, and requests for purchasing an item. In another example, requests can include requests to which the manager makes a decision, such as for a request that is triggered automatically from some process in the system and not necessarily by a person. Default criteria based on the collected data and supporting a determination of a recommended action in response to the given request is provided for presentation in the user interface. The user interface includes interactive sliders. Each interactive slider is associated with a criterion and has a default slider position associated with a relative weighting factor for the criterion. The default slider positions for each criteria can be set to a defined amount, based or updated on a particular user's preferences, based or updated on a particular user or set of user's prior interactions with the interactive sliders in other prior decisions, based on other user's interactions with the interactive sliders, based on past user decision, based on other users' decisions, or otherwise determined or defined. An algorithm is executed that is associated with a request type of the given request. Absolute weights are assigned to the default criteria using the relative weighting factors. The given request is evaluated using the default criteria and the assigned absolute weights to determine the recommended action in response to the given request. The recommended action is provided for presentation in the user interface.

Criteria weight levels can take into consideration the following components: 1) organizational policy; 2) dynamic organization strategy and business influential parameters; 3) a learning system, including manager behavior and preferences and organizational statistics regarding manager decisions; and 4) context awareness, including influencing the direction of the bars in relation to parameter values and their sensitivity. Criteria weight levels can be determined manually by an administrator setting up the system, and weights may or may not be adjusted according to the learning system.

In a simulator user interface, the following capabilities can exist. Each criteria can have its own weight-bar representation. Each criteria can be displayed with an up-to-date value (e.g., updated to the current time of a decision). Each criteria can provide a default suggested weight value (e.g., the user may also reset to default values). The simulator can provide a default suggested action, such as to approve or reject a request. The user may change the bar weight level by moving the bar slider up and down. Changed levels of the bar can influence the recommended action in real-time. Users can decide to ignore several criteria bars that are irrelevant by switching their bar off, and in that case, the switched-off bars will not affect the simulator calculations. Simulators can automatically ensure that turning off to a particular criteria will still result in a sum of weights that totals 100%. Users may compare a chosen weight bar level with a default suggested level in order to view the gap size. Reports can be provided per each decision taken, presenting the following: 1) chosen weight level per each criteria, 2) the gap between chosen and suggested criteria weight levels, 3) the decision taken, and 4) criteria values updated to the point that the decision took place. The simulator may deal with a single approval request or with multiple approval requests, e.g., presenting simulations simultaneously, thus presenting the dependency between them (which may make the relevant decisions easier).

The simulator can include a configuration environment for organization administrators. The administrator can add simulator criteria that fit the organization and calibrate each of the simulator bars corresponding to each criterion by configuring the desired weight per each criterion. For example, bar default weights may be: 1) configured according to an organization policy; 2) dynamic, e.g., calculated according to a learning system and statistics based on decisions collected by the system; or 3) a combination of an organization policy and a learning system.

Administrators need not bother themselves with a total sum of 100% calculated criteria weights, as the simulator engine can handle that, including summing-up all weights and calculating ratios between the bars. Administrators need only be responsible for choosing the desired criteria bars and setting up a weight per each bar in association with an algorithm.

The subject matter described in this specification can be implemented in particular implementations so as to realize one or more of the following advantages. First, automatically recommending an action can save time and avoid user error, conflicts, and confusion regarding complex decisions. For example, the user is provided with a feeling of certainty regarding a decision they need to make, and the user is provided with a way to make a decision according to consistent considerations. Second, an innovative and user-friendly user interface can be provided. Third, customer satisfaction and retention can be improved. Fourth, better control of the decision-making process can exist for a user/manager and for the entire organization. Fifth, the simulator may be relevant for different departments, including at least Finance, Capital Management, Operations/Purchasing, and Research and Development (R&D). Sixth, the system may also be relevant for organizational governance and compliance.

A recommended action simulator can include a simulator engine that provides the following elements: 1) data aggregation from several relevant sources (e.g., parameters values); 2) adaptation, e.g., weight bars that influence how the criteria is used; 3) preview and predictive "what if" capabilities, including default calculated criteria weights and recommended actions; and 4) reports provided through access to a report history that includes parameter values and criteria weights at the relevant point of time, indicating a view of how a decision was made. Different levels of configuration of weights and criteria can be used, including for example: a) defaults provided by the application, b) administrator-provided changes for an organization or a department, and c) user made adjustments.

FIG. 1 is a block diagram of an example environment 100 for providing a recommended action 101. The environment 100 includes a decision support system 102 that supports decision-based user actions 104 made by users 122 of user-interface components 106. Information used by the decision support system 102 and/or presented in the user-interface components 106 can include data received from backend systems 108. Based on information provided by the decision support system 102, the user 122 can make the decision-based user actions 104, including deciding whether to accept the recommended action 101 to approve or reject a travel request.

The decision support system 102 can include a decision support dynamic UI module 110 that uses stored algorithms and obtains data that supports the execution of the algorithms. The decision support smart dynamic UI 110 can provide information used to present, within user interfaces, interactive sliders that are associated with criteria used in specific algorithms. Example interfaces and interactive sliders are described below with reference to FIGS. 2-5B. The decision support smart dynamic UI 110 can support decision-based activities, including multiple approval and decision-based activities that are associated with the template.

The backend systems 108 systems can provide data relevant to a given request (such as a travel request or other decision-based activity 113) used to generate the recommended action 101 (e.g., a recommended action to approve the travel request). The backend systems 108 can include, for example, enterprise resource planning (ERP) systems 116, customer relationship management (CRM) systems 118, human resources (HR) systems 120, and other backend systems 121.

Decision algorithms 114 can be used by the decision support dynamic UI 110, which can support both the browser and server sides to generate recommended actions, such as the recommended action 101. The decision algorithms 114 can be defined by administrators that select the information that is to be used in the algorithms, such as particular data fields and/or other information obtained from the backend systems 108. Moreover, the algorithms can define, for example, how the selected information is to be used, such as in logic, formulas, rule sets, or other functions that identify how weighted inputs are used in combination to generate recommended actions. In some implementations, the algorithms can be generated by administrators and/or managers using a UI, through backend coding, or some combination thereof.

The decision support system 102 can include a learning system 112 that can be used to update default criteria for a particular algorithm. For example, based on decisions made by users 122, including user-adjusted criteria used in making the decisions, the learning system 112 can adjust the default criteria for a particular one of the decision algorithms 114. The learning system 112 may also suggest to the administrator when configuring criteria that is relevant to particular decisions.

The decision support system 102 can include a reporting mechanism 115 that can be linked to the smart template and the decision algorithms 114 in order to provide information about past decisions. For example, the reporting mechanism 115 can identify past decisions made by users 122 and the corresponding criteria and values thereof that were used to make the decisions. The smart template and the decision algorithms 114 can serve as, for example, a simulator instance or one instance of a simulator configuration, because there can be many such simulators configured in the organization. Each simulator can have associated reports per simulator instance, as well as cross-reports that apply to multiple simulators.

The environment 100 includes one or more clients 124, such as desktop computers, laptop/notebook computers, smart phones, personal data assistants (PDAs), tablet computing devices, and wearables.

The decision support system 102 can be an electronic computing device operable to store and provide access to information for use by the plural clients 124. For example, the decision support system 102 can provide access to components of the decision support system 102 for use in UI screens and applications 126 used by users 122 to make decisions, such as to approve or reject requests for travel or other requests.

The decision support system 102 can include various components 110-115. In some implementations, some or all of the components 110-115 can reside at the decision support system 102, remote from the clients 124. Additionally, some of the functionality of the components 110-115 can reside in UI screens and applications 126 located at, or accessible from or through, the clients 124. In some implementations, none, some, or all of the components 110-115 can also reside on remote systems outside of the decision support system 102 and can communicate via known communication methods.

Figure 2:
FIG. 2 is a screenshot of an example user interface for providing recommended actions.

FIG. 2 is a screenshot of an example user interface 200 for providing recommended actions. For example, the user interface 200 can be one of the UI screens and applications 126 that are presented to users 122 on clients 124.

The user interface 200 includes a display of entries 202, such as travel requests for various users who may be, for example, employees of a manager using the user interface 200 for approving (or rejecting) specific travel requests. The entries 202 can be associated, for example, with a specific request type 203 (e.g., "Travel Request"). An entry 202a that is of the request type 203, for example, can identify a user (e.g., by name, employee number, and/or in other ways) and can include the name, status, and cost associated with a travel request. Upon selection of a particular one of the entries 202, for example, detailed information for the travel request can be presented in a travel request information area 204, such as to also identify the employee, the requested travel, the status, and the cost. Other information not shown in the display of entries 202 for the selected travel request can be displayed.

The travel request information area 204 can include, within a criteria area 208 for example, a purpose 210 of the travel request, a planned date 212 of the travel request, and other information (e.g., billable-unbillable information 214 identifying whether the travel is billable or not). The travel request information area 204 can also include group-level criteria 216 (including criteria 216a-216e) and user-specific criteria 218 (including criteria 218a-218c) upon which the manager can base a decision to approve or reject the travel request. Data values for the group-level criteria 216 and the user-specific criteria 218 can include data associated with requests and used in supporting actions made regarding the requests, and the data values can be collecting from multiple sources, such as the backend systems 108.

The manager may make the decision by selecting one of the controls 222. In conventional systems in which manager decisions are based solely or primary on displayed data, such as in alpha-numeric form, the manager may make the decision based on visually reviewing and analyzing the group-level criteria 216 and the user-specific criteria 218. However, the user interface 200 includes a control 220 that, upon selection by the manager, provides a simulation, such as described with reference to FIGS. 3A and 3B.

Figure 3A:
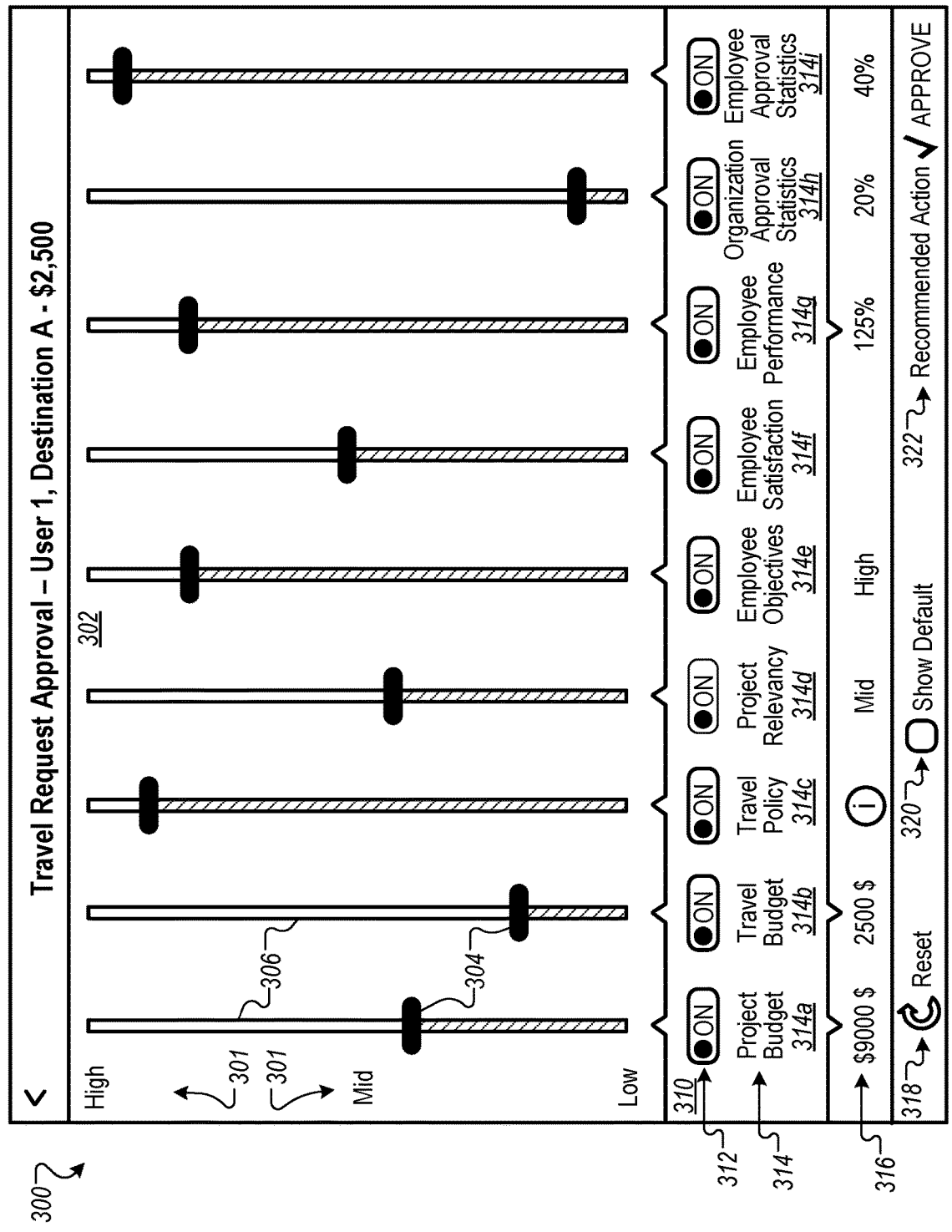
FIGS. 3A and 3B collectively show an example user interface for providing a recommended action.
Figure 3B:
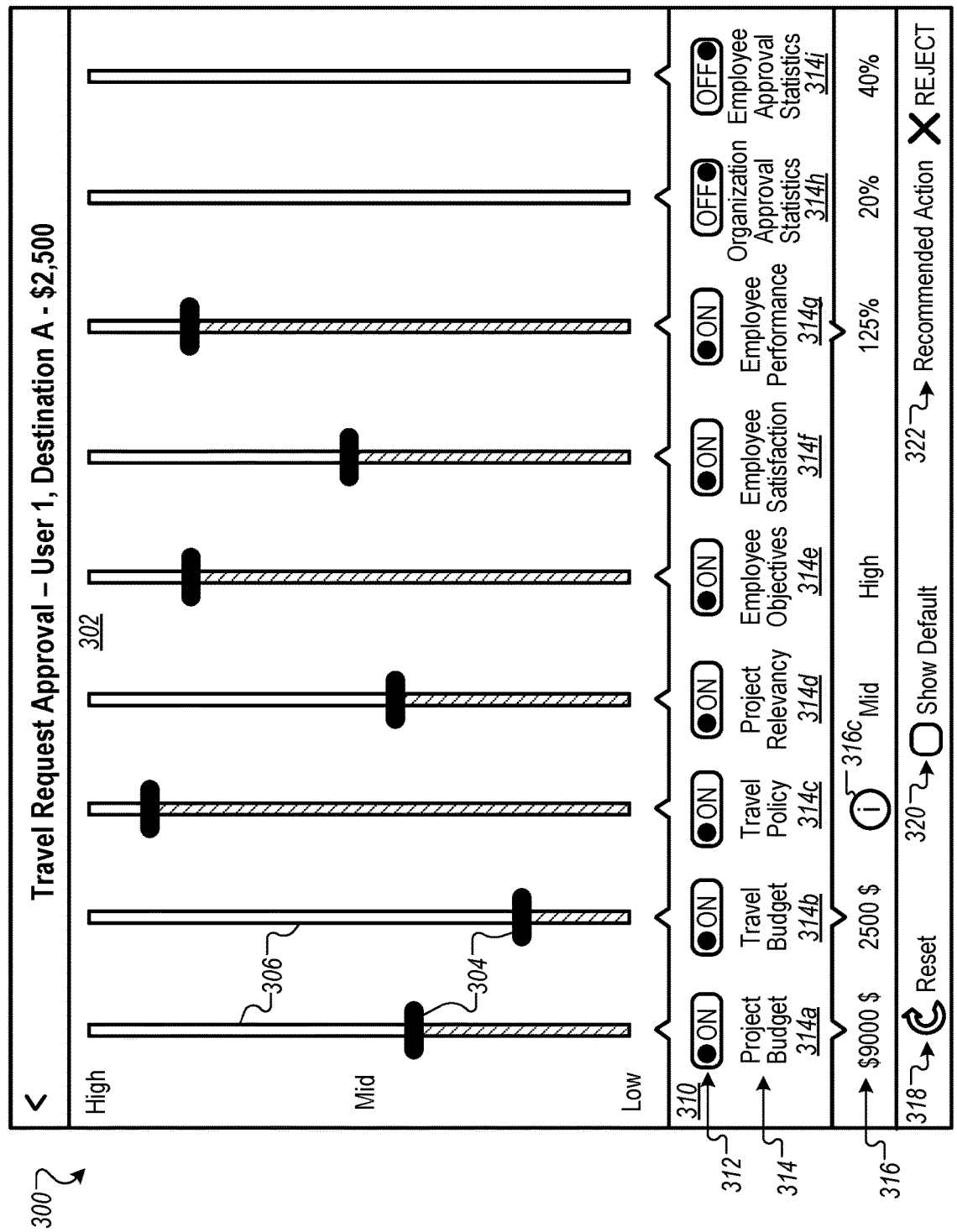

FIGS. 3A and 3B collectively show an example user interface 300 for providing a recommended action. A user, such as a manager, can use the user interface 300 to help in making decisions, for example, whether to approve or reject specific requests, such as individual travel requests. When the user interface 300 is initially displayed, such as after using the control 220, default criteria 302 can be presented based on values of the group-level criteria 216 and the user-specific criteria 218. The default criteria can also be based on past decisions by one or more managers. The default criteria 302 can be presented as a series of interactive sliders 306, with one interactive slider 306 associated with each of the criterion from respective ones of the group-level criteria 216 and the user-specific criteria 218. Each of the interactive sliders 306 has a default slider position 304 associated with a relative weighting factor for the criterion. At any given time, the position of the interactive sliders 306 can update the relative weights associated with corresponding ones of the criteria 314, and the updated relative weights can affect the current value of the recommended action 322, e.g., whether to approve (as shown in FIG. 3A) or reject (as shown in FIG. 3B) the travel request. Labels 301 are provided in the user interface 300 as a way to indicate relative low, medium, and high settings of the interactive sliders 306.

Using a control area 310, the manager can use on/off switches 312 to control whether a particular criterion is to be used in the determination of the recommended action 322. As shown in FIG. 3A, all of the on/off switches 312 for criteria 314 are currently turned on, while FIG. 3B shows the on/off switches 312 in an "off" position for criteria 314*h* and 314*i*. In FIG. 3B, for example, the interactive slider 306 for criteria 314*h* and 314*i* (for which the criteria are off) are shown with their slider controls removed, while the slider controls remain present for criteria 314*a* through 314*g*. In some implementations, relative weights that correspond to positions of the interactive sliders 306 are normalized, such as to total to 100% for the purposes of running the algorithm to determine a recommend action. As such, when a particular on/off switch 312 for a one of the criteria 316 is turned off, there is no weight for the criteria, as the criteria 316 can be removed from the algorithm. Alternatively, in some implementations, the relative weight for that particular criterion 316 can set to zero, and the relative weight percentages of the remaining criteria 316 can be adjusted upward accordingly, totaling the relative weight percentage negated by the particular criterion 316.

Display values 316 can display values (when applicable) for each of the criteria 314. In situations when a value is not applicable, such as for the travel policy criterion 314*c*, a control can be displayed, such as a control 316*c* that the manager can select to display an applicable (e.g., the organization's) travel policy. A reset control 318 can be used to reset the interactive sliders 306 to their default slider positions 304 that were present, such as upon initial display of the user interface 300 upon selection of the control 220 for a specific travel request.

Figure 5A:
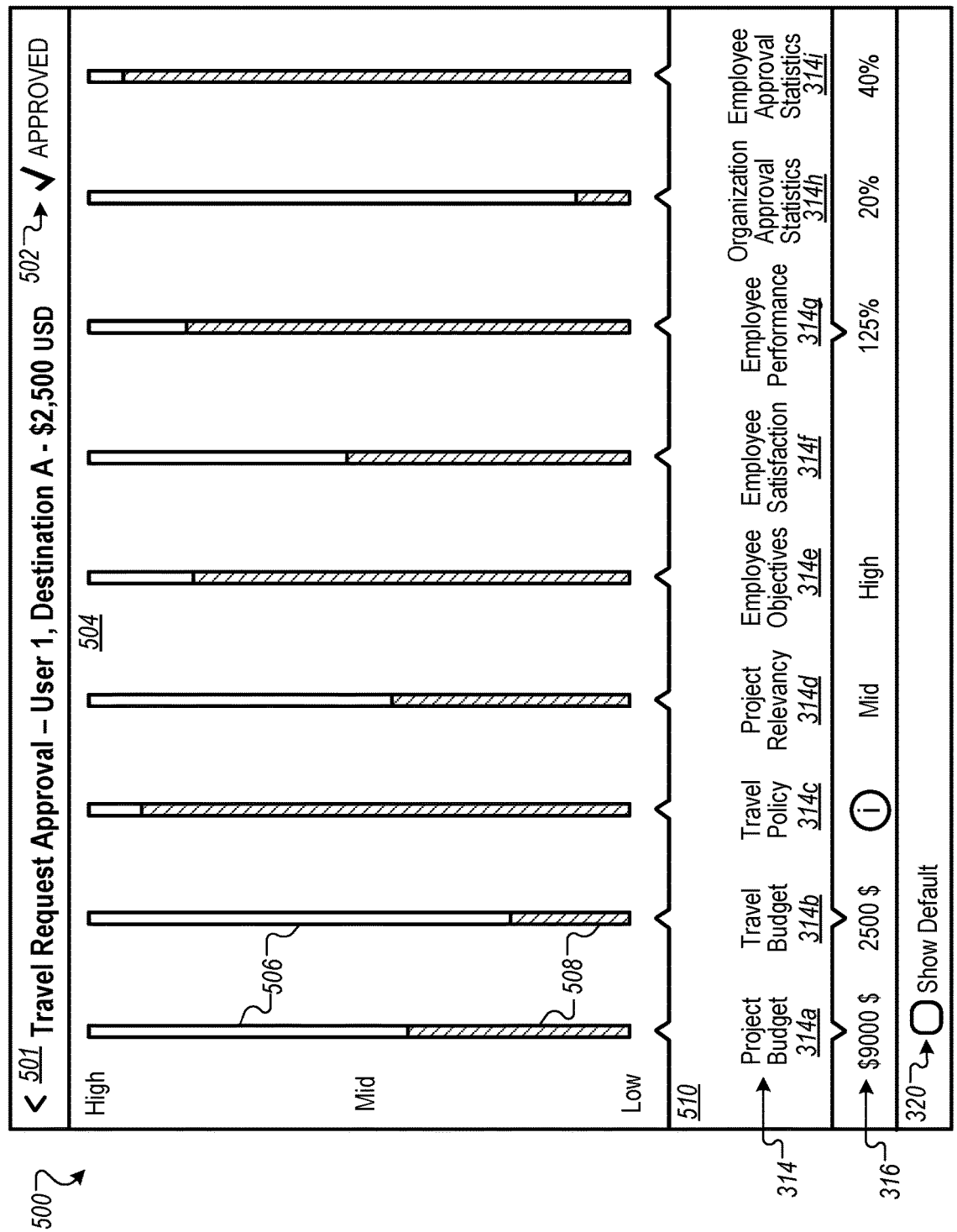
FIG. 5A is a screenshot of an example user interface showing criteria used for a travel request approval.
Figure 5B:
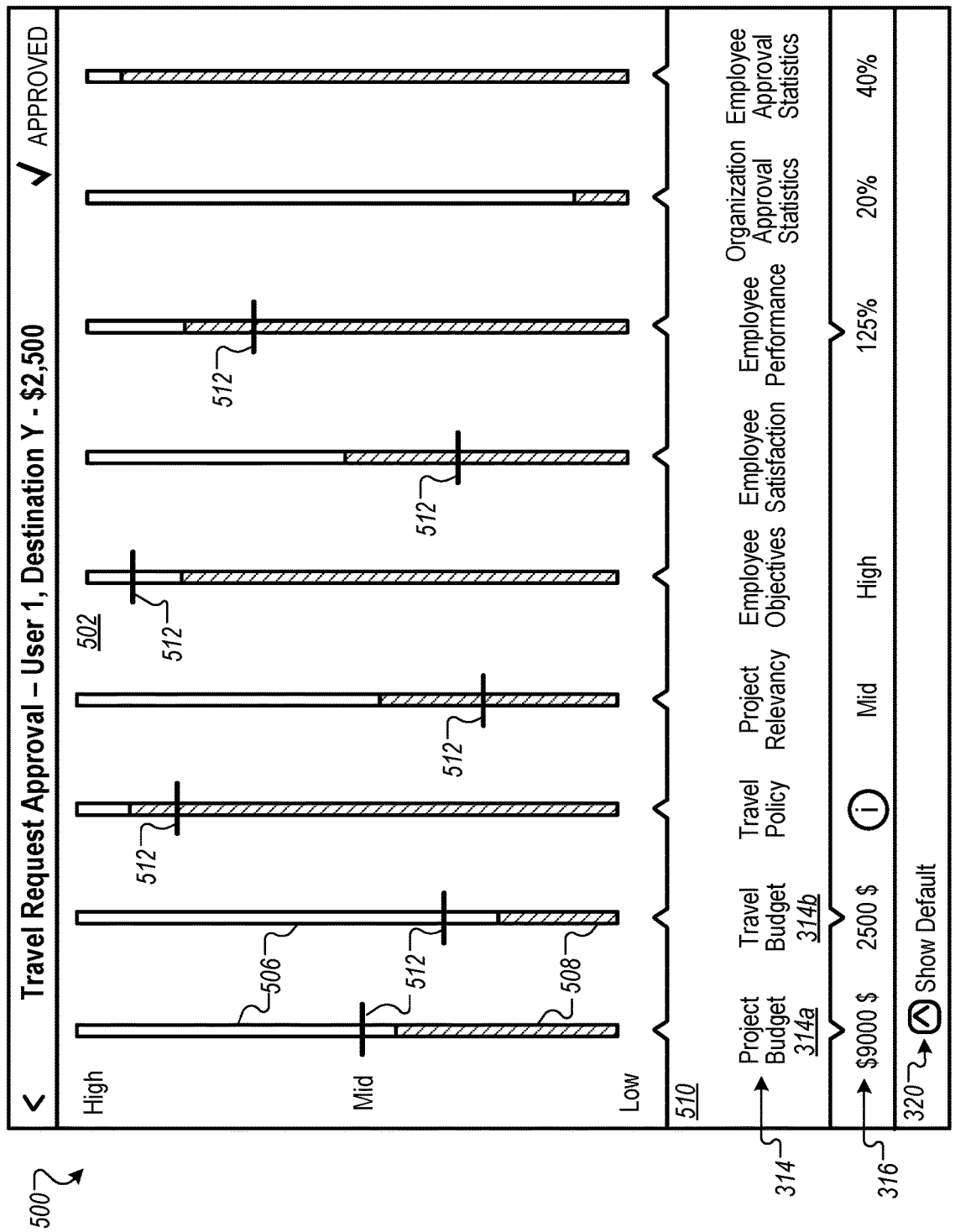
FIG. 5B is a screenshot of the example user interface showing criteria used for a travel request approval in which defaults are shown.

The user interface 300 can include a show default control 320 that, when used, display default values as positions on the interactive sliders 306, as shown by default value lines 512 in FIG. 5B. For example, the default value lines 512 show the initial positions of the slider bars upon initial entry of the user interface 300 as shown in FIG. 3A.

Whenever changes are made to positions of the interactive slider 306 (and upon initial display of the user interface 300), an algorithm is executed that is associated with a request type of the given request. Executing the algorithm can include assigning absolute weights to the default criteria, where determining the absolute weights is dependent on the relative weighting factors designated by current positions of the interactive sliders 306. In some implementations, the absolute weights can total to a specific value, such as 100%. Once the absolute weights are assigned, then the algorithm can evaluate the given travel request using the assigned absolute weights to determine the recommended action (e.g., the recommended action 322). In some implementations, rules can be established that effect max or min absolute weights for particular criteria, such as along the lines of, "Don't ever let the travel budget weight fall below X %."

Figure 4:
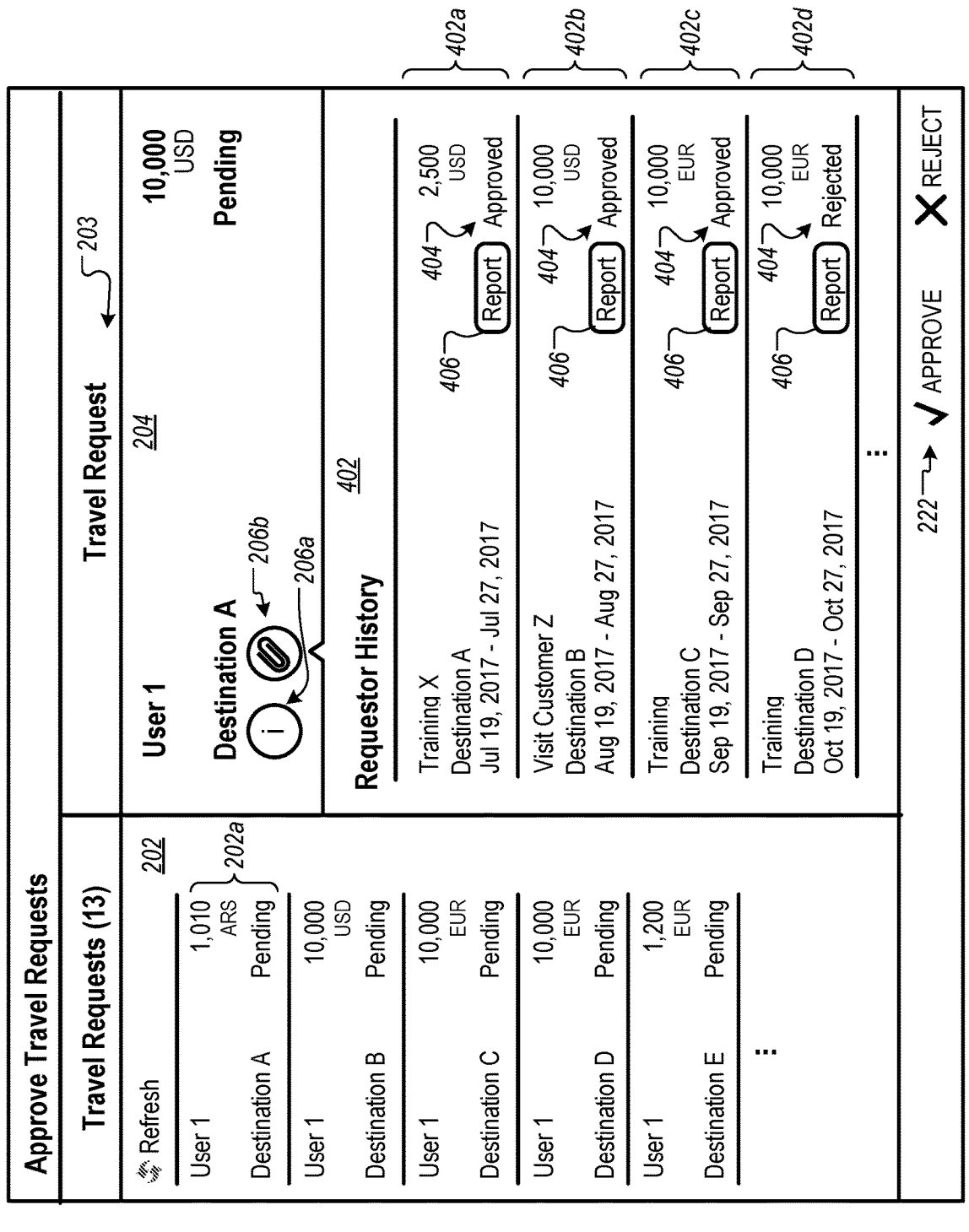
FIG. 4 is a screenshot of the example user interface in which requestor history is displayed.

FIG. 4 is a screenshot of the example user interface 200 in which requestor history 402 is displayed. For example, the requestor history 402 can be displayed when a history control 206*b* is selected by the manager who is processing travel requests. When the requestor history 402 is displayed, the manager can re-display the criteria area 208 by selecting the control 206*a*. The controls 222, described above, are active in the user interface 200, when either one of the criteria area 208 or the requestor history 402 are displayed. Reports described below with reference to FIGS. 5A and 5B include information that recording how past decision were made, with what criteria values at the time, and with what criteria weights. Reports can also shows the gaps between suggested default criteria values (and suggested actions) and elected criteria values (and actions). The reports can provide a manager with information useful in controlling the decision-making process. The reports can also provide a tool for organizational governance and compliance.

Entries 402*a*-402*d* can provide information regarding past decisions made for the employee, e.g., for the same employee as the employee for which the travel request is displayed in the user interface 200. The information provided can include a subject of the travel, a destination of the travel, a date range of the travel, and a cost of the travel, including the monetary currency associated with the cost. For each of entries 402*a*-402*d*, the requestor history 402 can also display an approval/rejection decision 404, identifying for each of the entries 402*a*-402*d*, whether the travel request was approved or rejected. Other information can also be provided for each of the entries 402*a*-402*d*. If additional entries exist in the requestor history 402, then scroll bars and/or other features can be used in order to allow the manager to scroll through the list of entries or to locate a particular entry, such as through input fields and/or search features. Scroll bars can also be used for other features of this disclosure.

A report control 406, if selected for a particular entry 402*a*-402*d*, can provide access to information that was used in making the approval/rejection decision 404. For example, by selecting the report control 406, the manager can view the particular criteria (e.g., the criteria 316 described above) that were used in arriving at a decision.

FIG. 5A is a screenshot of an example user interface 500 showing criteria used for a travel request approval. The user interface 500 can be displayed, for example, after the manager has selected the report control 406. For example, as indicated by information in a header 501, the user interface 500 includes travel request information associated with the entry 402*a*. The user interface 500 also includes a decision indicator 502, e.g., indicating that the travel request associated with the entry 402*a* was approved, matching the decision indicated in the approval/rejection decision 404. In a criteria settings area 504, shaded areas 508 on bars 506 represent magnitudes of interactive slider positions for the criteria 314 used in making the approval/rejection decision 404. Area 510 of the user interface 500 identifies each of the individual criteria 314*a*-314*i*.

FIG. 5B is a screenshot of the example user interface 500 showing criteria used for a travel request approval in which defaults are shown. For example, by selecting the show default control 320, the manager can cause the user interface 500 to display default value lines 512 indicating the defaults of each of the criterion at the time the decision was made.

FIG. 6 is a flowchart of an example method 600 for providing a recommended action. For clarity of presentation, the description that follows generally describes method 600 in the context of FIGS. 1 through 5B.

At 602, data that is associated with requests and is used in supporting actions made regarding the requests is collected from multiple sources. For example, the decision support system 102 can collect data from the backend systems 108 that are used to support decision-making actions, e.g., through the decision support dynamic UI module 110.

At 604, default criteria based on the collected data and supporting a determination of a recommended action in response to the given request is provided for presentation in the user interface. For example, the user interface 300 can present the default criteria 302 from which the recommended action 322 is to be determined, such as for a specific travel request made by the user and identified by the entry 202a. The user interface 300 can include the interactive sliders 306, each interactive slider 306 being associated with a criterion (e.g., criterion 314a-314i) and having a default slider position associated with a relative weighting factor for the criterion. For example, the criterion 314a can be associated with the criterion 216c having the same label (e.g., Project Budget), the criterion 314b can be associated with the criterion 216d (e.g., Project Relevancy), and so on.

In some implementations, the default criteria can be specific to a particular administrative group associated with the user. For example, the default criteria 302 can be associated with all travel requests for entries 202 for all employees of a given manager who is using the user interface 200 for approval/rejection of individual travel requests. As a result, different managers using the user interface 300 can see different sets of default criteria 302 that are initially presented.

In some implementations, the recommended action can be an approval or a rejection, such as provided by the recommended action 322. In some implementations, the recommended action can be one of three or more non-binary recommendations, such as APPROVE, REJECT, and PENDING, such as if additional information is requested from a user making the request or from another source. In some implementations, the recommended action can also include additional information that identifies a strength of (or score for) the recommended action which can be one or more numerical value. In some implementations, the recommended action can also include a qualification textual statement, such as providing information for potential adjustments by which the user can change the recommended action. For example, a qualified recommended action can include a REJECT recommended action and further include a qualification statement along the lines of "If you increase criteria X by Y %, the recommended action would change." Other types of qualification statements are possible.

At 606, an algorithm is executed that is associated with a request type of the given request. Request types can include, for example, travel requests, training requests, purchase requests, hiring requests, promotion requests, bonus requests, and other requests. As an example, the request type for the entry 202a is the request type 203 (e.g., "Travel Request").

In some implementations, the algorithm that is executed can be specifically associated with particular data. For example, the particular data can include one or more of key performance indicators (KPIs), policies, budget-related values, statistics regarding past selections, information used in accepting recommended actions, and other information. Each algorithm can include logic that determines how combinations of the particular data is to be used, such as to produce a result (e.g., APPROVE or REJECT). In some implementations, different algorithms and/or thresholds for determining recommended actions can exist for the same request type, such as different algorithms and/or thresholds that are specific to an employee, a group, a department, a particular role, a company, or some other grouping.

At 608, absolute weights are assigned to the default criteria using the relative weighting factors. For example, executing the algorithm can include assigning absolute weights to the default criteria, and determining the absolute weights can be dependent on the relative weighting factors designated by current positions of the interactive sliders 306. In some implementations, the absolute weights can total to a specific value, such as 100%.

At 610, the given request is evaluated using the default criteria and the assigned absolute weights to determine the recommended action in response to the given request. For example, once the absolute weights are assigned, then the algorithm can evaluate the given travel request using the assigned absolute weights to determine the recommended action (e.g., the recommended action 322).

In a first example, the manager may be deciding whether or not to approve a training request. For this type of request, the criteria and evaluation may be consider a budget-related criterion of "Remain Within Training Budget" and a performance-related criterion of "Employee Performance," each criterion having a relative weight that can be changed by the manager using the interactive sliders 306. WEIGHT_1 can be the relative weight associated with the budget-related criterion. WEIGHT_1 can be 1.0, e.g., if the training request is within budget, or 0.0 if the training request is outside of the budget. WEIGHT_2 can be the relative weight associated with the performance-related criterion. WEIGHT_2 can be 0.0 if the employee has low performance (e.g., in a system of rating performance between 1 and 5, performance values 1 or 2), 0.5 if the employee has medium performance (e.g., performance value 3), or 1.0 if the employee has high performance (e.g., performance values 4 or 5). The absolute weights used in executing the algorithm will depend on the values of WEIGHT_1 and WEIGHT_2, for which the computed absolute weights will total, for example, 100%. As such, if either the budget-related criterion or the performance-related criterion is turned off, then the absolute weight of the other weight becomes 100%. The algorithm can determine the recommended action based on:

$$\text{Weighted Sum} = \text{WEIGHT\_1} * (1 \text{ or } 0) + \text{WEIGHT\_2} * (0.0 \text{ or } 0.5 \text{ or } 1.0) \tag{1}$$

Assume that an administrator has set 0.5 as a threshold for approving the training request. When the Weighted Sum meets the admin-set threshold of 0.5, then the recommended action can be to approve the training request. Otherwise, when the Weighted Sum is less than the admin-set threshold of 0.5, then the recommended action can be to reject the training request.

In a second example, the manager may be deciding whether or not to approve a travel request. For this type of request, the criteria and evaluation may be consider a budget-related criterion of "Remain within Travel Budget" and a performance-related criterion of "Frequency of Employee Travels," each criterion having a relative weight that can be changed by the manager using the interactive sliders 306. WEIGHT_1 can be the relative weight associated with the budget-related criterion. WEIGHT_1 can be 0.0 if the cost of the travel would push the travel budget over 120% of the planned budget, 0.5 if the cost of the travel would push the travel budget to between 100% and 120% of the planned budget, and 1.0 if cost of the travel would keep the travel budget below 100% of the planned budget. WEIGHT_2 can be $(3-x)/3$, where x is the number of previous travel trips by the employee in a pre-determined time period. If the travel frequency criterion is turned on, then WEIGHT_2 is one of 0.0, ⅓, ⅔, or 1.0, depending on the number of previous travel trips by the employee (e.g., 3, 2, 1, and 0, respectively. More than 3 trips translate to 0 as well.). The absolute weights used in executing the algorithm will depend on the values of WEIGHT_1 and WEIGHT_2, for which the computed absolute weights will total, for example, 100%. Then the algorithm can determine the recommended action based on:

Weighted Sum=WEIGHT_1*(0.0 or 0.5 or 1.0)+
      WEIGHT_2                                        (2)

Assume that the administrator has set 0.8 as a threshold for approving the travel request. When the Weighted Sum meets the admin-set threshold of 0.8, then the recommended action can be to approve the travel request. Otherwise, when the Weighted Sum is less than the admin-set threshold of 0.8, then the recommended action can be to reject the travel request.

For each particular type of request, the administrator can define: 1) criteria used in determining a recommended action, including a) what remote service is to be invoked to retrieve a current value for a criterion (e.g., number of previous travel trips), and b) what type of algorithms and ranges (e.g., 0/1, linear, or other value sets/ranges) are used; and 2) a decision threshold, such as the 0.5 or 0.8 thresholds described above.

At 612, the recommended action is provided for presentation in the user interface. For example, the decision support system 102 can provide information to the client 124 so that the recommended action 322 can be displayed in the user interface 300.

In some implementations, the method 600 can further include receiving adjustments, via the user interface. The adjustments can including one or more of 1) receiving an adjustment to an interactive slider 306 for a criterion to a new slider position, and using the received adjustment to update the relative weighting factor for the criterion, and 2) receiving an adjustment to an on/off switch designating whether the criterion is used in the algorithm, and using the received adjustment to update the relative weighting factor for the criterion. The absolute weights for the criteria are recalculated based on the updated relative weighting factors. The algorithm is re-executed using the recalculated absolute weights, including recalculating the recommended action 322. The recalculated recommended action 322 is provided, for presentation in the user interface 300. The recommended action can be a first value (e.g., "reject"), and the recalculation of the recommended action can be a second value (e.g., "approve") different from the first value, e.g., because the received adjustment can cause the result of the algorithm to change.

In some implementations, the method 600 can further include executing a learning mechanism, in response to receiving adjustments to the interactive sliders, to determine an updated set of default criteria including default weights based on the received adjustments. For example, over time, based on received adjustments to the interactive sliders by one or more users, the learning system 112 can change the default values for the criteria, including causing the default positions of the interactive sliders to be different for additional presentations of the user interface 300.

In some implementations, the method 600 can further include receiving, through a template in a user interface, inputs changing a number of criteria associated with the algorithm. For example, one or more template user interfaces can exist that are different from the user interface 200 but can include user-changeable values for weights to be used for group-level criteria 216 and user-specific criteria 218. For example, metadata can be received about the number of criteria associated with the algorithm, and information can be provided for drawing a dynamic UI presenting information for the criteria, including sliding bars and controls.

Figure 7:
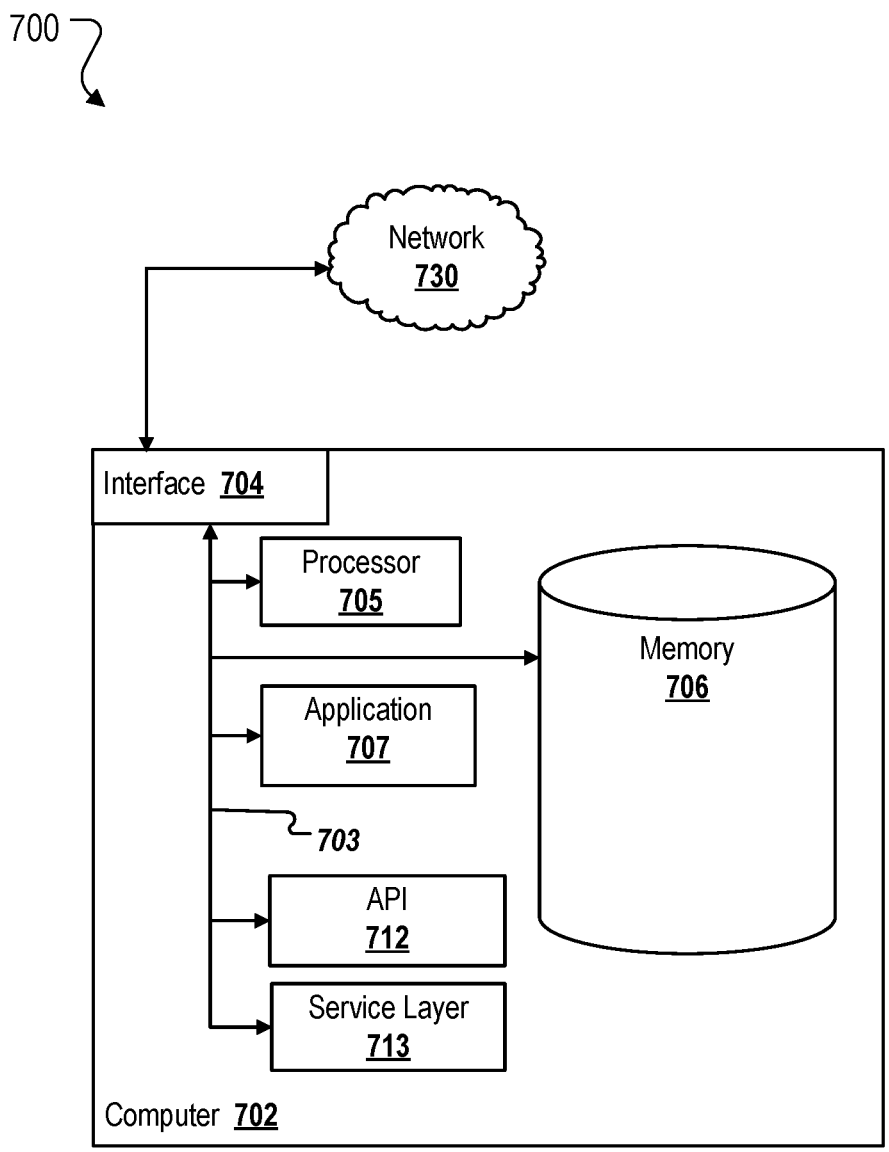
FIG. 7 is a block diagram of an exemplary computer system used to provide computational functionalities associated with described algorithms, methods, functions, processes, flows, and procedures as described in the instant disclosure.

FIG. 7 is a block diagram of an exemplary computer system 700 used to provide computational functionalities associated with described algorithms, methods, functions, processes, flows, and procedures as described in the instant disclosure.

The illustrated computer 702 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 702 may comprise a computer that includes an input device, such as a keypad, keyboard, touch screen, or other device that can accept user information, and an output device that conveys information associated with the operation of the computer 702, including digital data, visual, or audio information (or a combination of information), or a GUI.

The computer 702 can serve in a role as a client, network component, a server, a database or other persistency, or any other component (or a combination of roles) of a computer system for performing the subject matter described in the instant disclosure. The illustrated computer 702 is communicably coupled with a network 730. In some implementations, one or more components of the computer 702 may be configured to operate within environments, including cloud-computing-based, local, global, or other environment (or a combination of environments).

At a high level, the computer 702 is an electronic computing device operable to receive, transmit, process, store, or manage data and information associated with the described subject matter. According to some implementations, the computer 702 may also include or be communicably coupled with an application server, e-mail server, web server, caching server, streaming data server, business intelligence (BI) server, or other server (or a combination of servers).

The computer 702 can receive requests over network 730 from a client application (for example, executing on another computer 702) and responding to the received requests by processing the said requests in an appropriate software application. In addition, requests may also be sent to the computer 702 from internal users (for example, from a command console or by other appropriate access method), external or third-parties, other automated applications, as well as any other appropriate entities, individuals, systems, or computers.

Each of the components of the computer 702 can communicate using a system bus 703. In some implementations, any or all of the components of the computer 702, both hardware or software (or a combination of hardware and software), may interface with each other or the interface 704 (or a combination of both) over the system bus 703 using an application programming interface (API) 712 or a service layer 713 (or a combination of the API 712 and service layer 713). The API 712 may include specifications for routines, data structures, and object classes. The API 712 may be either computer-language independent or dependent and refer to a complete interface, a single function, or even a set of APIs. The service layer 713 provides software services to the computer 702 or other components (whether or not illustrated) that are communicably coupled to the computer 702. The functionality of the computer 702 may be accessible for all service consumers using this service layer. Software services, such as those provided by the service layer 713, provide reusable, defined business functionalities through a defined interface. For example, the interface may be software written in JAVA, C++, or other suitable language providing data in extensible markup language (XML) format or other suitable format. While illustrated as an integrated component of the computer 702, alternative implementations may illustrate the API 712 or the service layer 713 as stand-alone components in relation to other components of the computer 702 or other components (whether or not illustrated) that are communicably coupled to the computer 702. Moreover, any or all parts of the API 712 or the service layer 713 may be implemented as child or sub-modules of another software module, enterprise application, or hardware module without departing from the scope of the instant disclosure.

The computer 702 includes an interface 704. Although illustrated as a single interface 704 in FIG. 7, two or more interfaces 704 may be used according to particular needs, desires, or particular implementations of the computer 702. The interface 704 is used by the computer 702 for communicating with other systems in a distributed environment that are connected to the network 730 (whether illustrated or not). Generally, the interface 704 comprises logic encoded in software or hardware (or a combination of software and hardware) and operable to communicate with the network 730. More specifically, the interface 704 may comprise software supporting one or more communication protocols associated with communications such that the network 730 or interface's hardware is operable to communicate physical signals within and outside of the illustrated computer 702.

The computer 702 includes a processor 705. Although illustrated as a single processor 705 in FIG. 7, two or more processors may be used according to particular needs, desires, or particular implementations of the computer 702. Generally, the processor 705 executes instructions and manipulates data to perform the operations of the computer 702 and any algorithms, methods, functions, processes, flows, and procedures as described in the instant disclosure.

The computer 702 also includes a memory 706 that holds data for the computer 702 or other components (or a combination of both) that can be connected to the network 730 (whether illustrated or not). For example, memory 706 can be a database storing data consistent with this disclosure. Although illustrated as a single memory 706 in FIG. 7, two or more memories may be used according to particular needs, desires, or particular implementations of the computer 702 and the described functionality. While memory 706 is illustrated as an integral component of the computer 702, in alternative implementations, memory 706 can be external to the computer 702.

The application 707 is an algorithmic software engine providing functionality according to particular needs, desires, or particular implementations of the computer 702, particularly with respect to functionality described in this disclosure. For example, application 707 can serve as one or more components, modules, applications, etc. Further, although illustrated as a single application 707, the application 707 may be implemented as multiple applications 707 on the computer 702. In addition, although illustrated as integral to the computer 702, in alternative implementations, the application 707 can be external to the computer 702.

There may be any number of computers 702 associated with, or external to, a computer system containing computer 702, each computer 702 communicating over network 730. Further, the term "client," "user," and other appropriate terminology may be used interchangeably as appropriate without departing from the scope of this disclosure. Moreover, this disclosure contemplates that many users may use one computer 702, or that one user may use multiple computers 702.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
   collecting, from multiple sources, data associated with requests and used in supporting actions made regarding the requests;
   providing, for presentation in the user interface, default criteria based on the collected data and supporting a determination of a recommended action in response to the given request, the user interface including interactive sliders, each interactive slider associated with a criterion and having a default slider position associated with a relative weighting factor for the criterion;
   executing an algorithm associated with a request type of the given request including:
      assigning, using the relative weighting factors, absolute weights to the default criteria; and
      evaluating the given request using the default criteria and the assigned absolute weights to determine the recommended action in response to the given request;
   providing, for presentation in the user interface, the recommended action; and
   receiving, from a template in a user interface, inputs changing a number of criteria associated with the algorithm, including receiving metadata about the number of criteria associated with the algorithm, and providing information for drawing a dynamic user interface presenting information for the criteria, including sliding bars and controls.

2. The computer-implemented method of claim 1, further comprising:
   receiving adjustments, via the user interface, including one or more of:
      receiving an adjustment to an interactive slider for a criterion to a new slider position, and using the received adjustment to update the relative weighting factor for the criterion; and
      receiving an adjustment to an on/off switch designating whether the criterion is used in the algorithm, and using the received adjustment to update the relative weighting factor for the criterion;
   recalculating, based on the updated relative weighting factors, the absolute weights for the criteria;
   re-executing the algorithm using the recalculated absolute weights, including recalculating the recommended action; and
   providing, for presentation in the user interface, the recalculated recommended action.

3. The computer-implemented method of claim 2, wherein the recommended action is a first value and a recalculation of the recommended action is a second value different from the first value.

4. The computer-implemented method of claim 2, further comprising:
   in response to receiving adjustments to the interactive sliders, executing a learning mechanism to determine an updated set of default criteria including default weights based on the received adjustments.

5. The computer-implemented method of claim 1, wherein the recommended action is one of an approval or a rejection.

6. The computer-implemented method of claim 1, wherein the default criteria are specific to a particular administrative group associated with the user.

7. The computer-implemented method of claim 1, wherein the recommended action is specific to a request by a user.

8. The computer-implemented method of claim 1, wherein the algorithm is specifically associated with particular data.

9. A system comprising:
   memory storing decision algorithms and decision-based activities; and
   a server performing operations comprising:
      collecting, from multiple sources, data associated with requests and used in supporting actions made regarding the requests;
      providing, for presentation in the user interface, default criteria based on the collected data and supporting a determination of a recommended action in response to the given request, the user interface including interactive sliders, each interactive slider associated with a criterion and having a default slider position associated with a relative weighting factor for the criterion;
      executing an algorithm associated with a request type of the given request including:
         assigning, using the relative weighting factors, absolute weights to the default criteria; and
         evaluating the given request using the default criteria and the assigned absolute weights to determine the recommended action in response to the given request;
      providing, for presentation in the user interface, the recommended action; and
      receiving, from a template in a user interface, inputs changing a number of criteria associated with the algorithm, including receiving metadata about the number of criteria associated with the algorithm, and providing information for drawing a dynamic user interface presenting information for the criteria, including sliding bars and controls.

10. The system of claim 9, the operations further comprising:
    receiving adjustments, via the user interface, including one or more of:

receiving an adjustment to an interactive slider for a criterion to a new slider position, and using the received adjustment to update the relative weighting factor for the criterion; and receiving an adjustment to an on/off switch designating whether the criterion is used in the algorithm, and using the received adjustment to update the relative weighting factor for the criterion;

recalculating, based on the updated relative weighting factors, the absolute weights for the criteria;

re-executing the algorithm using the recalculated absolute weights, including recalculating the recommended action; and providing, for presentation in the user interface, the recalculated recommended action.

11. The system of claim 10, wherein the recommended action is a first value and a recalculation of the recommended action is a second value different from the first value.

12. The system of claim 10, the operations further comprising:
in response to receiving adjustments to the interactive sliders, executing a learning mechanism to determine an updated set of default criteria including default weights based on the received adjustments.

13. The system of claim 9, wherein the recommended action is one of an approval or a rejection.

14. The system of claim 9, wherein the default criteria are specific to a particular administrative group associated with the user.

15. A non-transitory computer-readable media encoded with a computer program, the program comprising instructions that when executed by one or more computers cause the one or more computers to perform operations comprising:

collecting, from multiple sources, data associated with requests and used in supporting actions made regarding the requests;

providing, for presentation in the user interface, default criteria based on the collected data and supporting a determination of a recommended action in response to the given request, the user interface including interactive sliders, each interactive slider associated with a criterion and having a default slider position associated with a relative weighting factor for the criterion;

executing an algorithm associated with a request type of the given request including:
assigning, using the relative weighting factors, absolute weights to the default criteria; and
evaluating the given request using the default criteria and the assigned absolute weights to determine the recommended action in response to the given request;

providing, for presentation in the user interface, the recommended action;

receiving adjustments, via the user interface, including one or more of:
receiving an adjustment to an interactive slider for a criterion to a new slider position, and using the received adjustment to update the relative weighting factor for the criterion; and
receiving an adjustment to an on/off switch designating whether the criterion is used in the algorithm, and using the received adjustment to update the relative weighting factor for the criterion;

recalculating, based on the updated relative weighting factors, the absolute weights for the criteria;

re-executing the algorithm using the recalculated absolute weights, including recalculating the recommended action; and providing, for presentation in the user interface, the recalculated recommended action.

16. The non-transitory computer-readable media of claim 15, wherein the recommended action is a first value and a recalculation of the recommended action is a second value different from the first value.

17. The non-transitory computer-readable media of claim 15, the operations further comprising:
in response to receiving adjustments to the interactive sliders, executing a learning mechanism to determine an updated set of default criteria including default weights based on the received adjustments.

18. The non-transitory computer-readable media of claim 15, wherein the recommended action is one of an approval or a rejection.

* * * * *